United States Patent [19]

Bergmann et al.

[11] Patent Number: 5,716,553
[45] Date of Patent: *Feb. 10, 1998

[54] POLYTYPE ELECTROCONDUCTIVE POWDERS

[75] Inventors: Oswald Robert Bergmann, Wilmington; Carl Chen, Newark; Howard Wayne Jacobson, Wilmington, all of Del.

[73] Assignee: E. I. du Pont de Nemours and Company, Wilmington, Del.

[*] Notice: The term of this patent shall not extend beyond the expiration date of Pat. No. 5,545,250.

[21] Appl. No.: 647,522

[22] Filed: May 15, 1996

Related U.S. Application Data

[62] Division of Ser. No. 322,028, Oct. 12, 1994, Pat. No. 5,545,250, which is a continuation of Ser. No. 100,875, Jul. 30, 1993, abandoned.

[51] Int. Cl.⁶ .................. H01B 1/08; H01B 1/20
[52] U.S. Cl. .................. 252/518; 75/252; 106/1.18; 106/1.22; 428/363; 428/402
[58] Field of Search .................. 252/510, 511, 252/513, 514, 518, 520; 75/252; 106/1.18, 1.22; 428/363, 402, 405, 406

[56] References Cited

U.S. PATENT DOCUMENTS

| | | | |
|---|---|---|---|
| 4,373,013 | 2/1983 | Yoshisumi | 428/570 |
| 4,452,830 | 6/1984 | Yoshisumi | 427/215 |
| 5,024,826 | 6/1991 | Linton | 423/335 |
| 5,118,578 | 6/1992 | Berger et al. | 428/413 |
| 5,192,613 | 3/1993 | Werks III et al. | 428/363 |
| 5,284,705 | 2/1994 | Cahill | 428/328 |
| 5,292,551 | 3/1994 | Jacobson | 427/215 |
| 5,320,781 | 6/1994 | Stahlecker et al. | 252/518 |
| 5,364,566 | 11/1994 | Jacobson | 252/518 |
| 5,396,148 | 3/1995 | Endo et al. | 313/479 |
| 5,476,613 | 12/1995 | Jacobson | 252/518 |
| 5,569,413 | 10/1996 | Jacobson | 252/518 |

FOREIGN PATENT DOCUMENTS

| | | |
|---|---|---|
| 0359569 | 3/1990 | European Pat. Off. . |
| 0439161 | 7/1991 | European Pat. Off. . |
| 6320342 | 1/1988 | Japan . |
| 63285119 | 11/1988 | Japan . |
| 1543537 | 10/1969 | Netherlands . |

OTHER PUBLICATIONS

Randall M. German, Particle Packing Characteristics, 1989, 253–274, Jan. 6, 1992. Metal Powder Industries Federation, Princeton New Jersey.

Yoshizumi et al., Electroconductive Powder with Transparent Characteristics, 1985, pp. 410–419, 17th National Sampe Technical Conference (Oct. 1985).

Yoshimuzi et al., *Journal of Materials Science*, Preparation and Properties of Antimony–Doped SnO2 Films by Thermal Decomposition of Tin 2–ethylhexanoate, 1986, 2731–2734, vol. 21, No Month Available.

*Primary Examiner*—Douglas J. McGinty
*Assistant Examiner*—Mark Kopec

[57] ABSTRACT

The disclosure relates broadly to a new class or type of electroconductive powders (ECP), designated as Polytype ECP (PECP), comprising intimate mixtures of several types of ECP powders. PECP mixtures possess a lower electrical resistivity, or a higher electroconductivity, than would be expected from the weighted average of the component ECP powders. PECP are multi-component and may contain many different types of ECP. ECP components of the PECP can be selected from at least one member of the group consisting of crystallites of tin oxide containing antimony in solid solution, crystallites of antimony-containing tin oxide with uniformly distributed amorphous silica, two dimensional networks of crystallites of antimony-containing tin oxide in a unique association with amorphous silica or silica-containing material, filler materials, metal coated powders, conventional ECP materials such as carbon, aluminum powder, among others.

10 Claims, 6 Drawing Sheets

POLYTYPE ELECTROCONDUCTIVE POWDERS

CROSS REFERENCES TO RELATED APPLICATIONS

This is a divisional of application Ser. No. 08/322,028 filed Oct. 12, 1994 now U.S. Pat. No. 5,545,250, which is a continuation of application Ser. No. 08/100,875 filed Jul. 30, 1993, now abandoned.

FIELD OF THE INVENTION

The present invention relates to a new class of electroconductive powders (hereinafter referred to as "ECP"). When the ECPs of the invention are incorporated in coatings, films, among many other materials, the ECPs form an interconnecting electroconductive network.

BACKGROUND OF THE INVENTION

Electroconductive powders in general, and those comprising antimony-containing tin oxide and using such powders for imparting electroconductive properties to a wide variety of surfaces are known generally to the art.

National SAMPE Technical Conference 17,410–419, 1985 describes a powder consisting of conductive Sb-doped $SnO_2$ which is used in a paint to produce a transparent conductive film. Journal of Materials Science, 21,2731–2734, 1986 describes Sb-doped $SnO_2$ films on glass substrates. Japanese Patent No. SHO 63[1988]20342 discloses a method of manufacturing fine electroconductive mica particles by coating them with a tin oxide/antimony oxide mixture. Japanese Patent 63(1989)285119 discloses electroconductive powders comprising flaked particles, such as mica or kaolinite which are coated with $TiO_2$ and $SnO_2$ containing 0.1 to 25 wt %. Sb. U.S. Pat. Nos. 4,373,013 and 4,452,830 disclose preparing an electroconductive powder having a structure comprising titanium oxide particles as nuclei with a coating of antimony-containing tin oxide on the surface of the titanium oxide particles. European Patent Application Publication No. 0 359 569 (which corresponds to U.S. patent application Ser. No. 07/386,765, now allowed), discloses electroconductive compositions comprising particles having a thin surface layer of amorphous silica or silica-containing material, said material having a thin surface coating layer which comprises a network of antimony-containing tin oxide crystallites. U.S. Pat. No. 5,024,826 discloses an amorphous silica material in the form of hollow shells which are obtained by dissolving the original particle on which the silica was deposited. U.S. patent application Ser. No. 07/905,980 filed on Jun. 29, 1992 discloses an electroconductive powder which is in the form of agglomerates comprising fine crystallites of antimony-containing tin oxide uniformly distributed with amorphous silica. Further, U.S. patent application Ser. No. 07/906,076 filed on Jun. 29, 1992 discloses an electroconductive powder which is in the form of an electroconducting network of antimony-containing tin oxide crystallites and silica upon a substrate particle. U.S. Pat. No. 5,192,613 discloses an electroconductive film, which can contain two types of electroconductive materials described in European Patent Application Publication No. 0 359 569 (corresponding to U.S. patent application Ser. No. 07/386,765), that are added separately to a polymeric binder prior to casting an electroconductive coating for making an electrographic recording element.

The disclosure of each of the above-identified documents, patent applications and patents is hereby incorporated by reference.

SUMMARY OF THE INVENTION

The present invention relates broadly to a new class or type of electroconductive powders (ECP), designated as Polytype ECP (hereinafter referred to as "PECP"), comprising intimate mixtures of several types of ECP powders. PECP are multi-component and may contain many different types of ECP. Binary or ternary mixtures are normally preferred. In an embodiment the electroconductive property derives from antimony-containing tin oxide crystallites. PECP mixtures possess a lower electrical resistivity, or a higher electroconductivity, than would be expected from the weighted average of the component ECP powders.

ECP components of the PECP can be selected from at least one member of the group consisting of crystallites of tin oxide containing antimony in solid solution, crystallites of antimony-containing tin oxide with uniformly distributed amorphous silica, and two dimensional networks of crystallites of antimony-containing tin oxide in a unique association with amorphous silica or silica-containing material, metal coated powders, among others. In some cases, one or more components of the PECP can comprise conventional ECP materials such as carbon, aluminum powder, among others. When incorporated into surface coatings, films and other substrates, PECPs impart electroconductivity while using a relatively lesser amount of antimony-containing tin oxide in comparison to the amount of antimony-containing tin oxide than would be required if the individual component ECP types were used. In addition to providing a substantial economic advantage, the PECPs reduce the quantity of antimony that is present thereby minimizing color and achieving greater transparency.

One unexpected result obtained by using PECPs is that the PECP is less sensitive to the degree of loading, than when individual component ECP types are used thereby permitting enhanced control over electroconductivity.

In one aspect of the invention the PECP composition may comprise at least one filler particulate material, which is neither associated with antimony-containing tin oxide nor electroconductive, and at least one ECP.

In another aspect, the invention relates to a process for preparing the compositions of the invention that consists essentially of a relatively gentle mixing procedure which is sufficient to cause an intimate mixing of the ECP components by intermingling individual component powders without significantly disrupting the electroconductive network coating upon the component ECPs.

In yet another aspect, the invention relates to electroconductive coatings which comprise or consist essentially of the PECP, which imparts the conductivity, and a carrier matrix or vehicle system. Examples of suitable matrices or vehicles for producing an electroconductive coating comprise at least one member from the group of paint, varnish, plastic films, fabrics and paper, among others.

While the individual ECP components of the PECP are known in this art mixtures having properties of the PECP were heretofore unknown. The PECP has a lower electrical resistivity (or higher conductivity) than would be predicted by the weighted average of the electrical resistivities for the component ECP powders, among other desirable properties. By reducing the quantity of antimony that is necessary for conductivity, the PECP solves color and transparency problems associated with conventional ECPs.

DETAILED DESCRIPTION

The present invention relates broadly to a new class or type of electroconductive powders (ECP), designated as Polytype ECP (hereinafter referred to as "PECP"), comprising or consisting essentially of intimate mixtures of several types of ECP powders. PECP mixtures possess a lower electrical resistivity, or a higher electroconductivity, than would be expected from the weighted average of the component ECP powders. PECP are multi-component and may contain many different types of ECP. Binary or ternary mixtures are normally preferred.

ECP components of the PECP can be selected from at least one member from the group consisting of crystallites of tin oxide containing antimony in solid solution, crystallites of antimony-containing tin oxide with uniformly distributed amorphous silica, and two dimensional networks of crystallites of antimony-containing tin oxide in a unique association with amorphous silica or silica-containing material, metal coated powders, among others. The PECPs can be employed as a substitute for conventional ECPs, e.g., to enhance cost-effectiveness or obtain improved performance. When incorporated into surface coatings, films and other substrates, PECPs impart electroconductivity while using a relatively lesser amount of antimony-containing tin oxide in comparison to the amount of antimony-containing tin oxide that would be required if the individual component ECP types were used. In addition to providing a substantial economic advantage, the PECPs reduce the quantity of antimony that is present thereby minimizing color and achieving greater transparency.

In one aspect of the invention the PECP composition may comprise at least one filler particulate material, which is neither associated with antimony-containing tin oxide nor electroconductive, and at least one ECP.

In another aspect, the invention relates to a process for preparing the compositions of the invention that consists essentially of a relatively gentle mixing procedure which is sufficient to cause an intimate mixing of the ECP components by intermingling individual component powders without significantly disrupting the electroconductive network of the component ECPs.

In yet another aspect, the invention relates to electroconductive coatings which comprise or consist essentially of the PECP, which imparts the conductivity, and a carrier matrix or vehicle system. Examples of suitable matrices or vehicles for producing an electroconductive coating comprise at least one member from the group of paint, varnish, plastic films upon fabrics and paper, among others. In some cases, the PECP may be a component within a filled plastic, e.g., polyester, acrylics, polyethylene, polypropylene, polystyrene, nitrocellulose, nylon, among others.

While the certain individual ECP components of the PECP are known in this art, mixtures having properties of the PECP were heretofore unknown. For example, the PECP has a lower electrical resistivity (or higher conductivity) than would be predicted by the weighted average of the electrical resistivities for the component ECP powders, among other desirable properties. By reducing the quantity of antimony that is necessary for conductivity, the PECP solves color and transparency problems associated with conventional ECPs. Normally, the total quantity of antimony in a PECP ranges from about 0.5 to about 20% by weight.

Suitable components for preparation of PECPs can be selected from known ECP materials.

ECPs can comprise or consist essentially of tin oxide containing about 0.5 to about 12.5 wt % of antimony in solid solution without a core material; hereinafter referred to as "ECP-XC". ECP-XC comprises or consist essentially of at least one member from the group of crystallites of tin oxide containing antimony in a solid solution [SnO2(Sb)] wherein antimony is substituted for tin in the tin oxide crystalline lattice, crystallites of antimony-containing tin oxide with uniformly distributed amorphous silica, and two-dimensional networks of crystallites of antimony-containing tin oxide in a unique association with amorphous silica and/or a silica containing material, among others. The powders can be prepared by any suitable method such as described in J.P. 61,286-224; hereby incorporated by incorporated by reference, or obtained from commercial sources, such as ZELEC-ECP-3005-XC which is available from DuPont, Wilmington, Del., U.S.A.. ECP-XC normally is a compositionally homogeneous material and therefore, can be subjected to aggressive milling and mixing procedures. The average particle size of micronized powder usually ranges between about 0.1 and about 5 microns.

The ECP composition can be a powder comprising or consisting essentially of shaped particles such as at least one member from the group of amorphous silica, inert core particles coated with amorphous silica, hollow amorphous silica shells, among others. Suitable core particles comprise at least one member from the group of oxides of titanium, magnesium, calcium, barium, strontium, zinc, tin, nickel and iron; carbonates and sulfates of calcium, barium and strontium; mica, cordierite, anorthite and pyrophyllite, among others. The primary function of the core material is providing a shaped particle upon which the amorphous silica substrate can be deposited. These types of powders and methods for their preparation are described in greater detail in U.S. Pat. No. 5,024,826 and European Patent Application Publication No. 0 359569 (corresponding to U.S. patent application Ser. No. 07/386,765), the disclosure of which have been incorporated by reference.

ECPs in which silica is coated upon core particles comprising or consisting essentially of mica platelets have a conducting layer of antimony-containing tin oxide, hereinafter referred to as "ECP-M". The average particle size of this material typically ranges from about 0.1 to about 20 microns wherein the individual coated platelet shaped particles have an aspect ratio of diameter to thickness that typically ranges between about 10 and about 100. Normally, the platelet thickness is less than about 0.25 microns. The platy morphology of ECP-M facilitates the particles forming an interconnecting electroconductive network within a thin film. These powders, when dispersed in suitable binders, e.g., "HTV" VARNISH, are essentially transparent.

Powders comprising or consisting essentially of hollow shells of amorphous silica having a surface coating layer of antimony-containing tin oxide; hereinafter referred to as "ECP-S". The average particle size for ECP-S is typically in the range of 0.5 to 15 microns and the particle shape, determined by the shape of the core material which is removed after depositing a coating of amorphous silica, can be irregularly equiaxed or acicular. Generally this type of ECP provides the highest efficiency-in-use based on the loadings required in film coatings to achieve a desired level of electroconductivity.

Powders comprising or consisting essentially of a silica coated solid core of titanium dioxide covered with an conductive coating of antimony-containing tin oxide; hereinafter referred to as "ECP-T". The average particle size of this material is typically in the range of 0.1 to 20 microns and the particles are predominantly equiaxed. While any suitable method can be used for preparing this powder, the method described in U.S. patent application Ser. No. 07/874,878, filed on Apr. 28, 1992, hereby incorporated by reference, is particularly useful.

The ECP component powders can also comprise or consist essentially of about 0.5 to about 20 wt % amorphous $SiO_2$ substantially uniformly distributed with about 80 to about 99.5 wt % of crystallites of antimony-containing tin oxide, wherein the antimony component of the tin oxide ranges from between about 0.5 to about 12.5 wt %. While any suitable method can be used for preparing this powder, the method described in U.S. patent application Ser. No. 07/905,980, previously incorporated by reference, is particularly useful.

Further, one or more components of the PECP can comprise conventional ECP materials such as carbon, aluminum powder, among others. In some cases, the ECP components powders comprise or consist of hollow shells of silica having a surface coating layer comprising at least one metal selected from the group of Pd, Pt, Rh, Re, In, Au, Ag, Cu Ni, among others. These metal coated powders are described in greater detail in U.S. patent application Ser. No. 07/979,497, filed on Nov. 20, 1992; the subject matter of which is hereby incorporated by reference.

Characteristics of certain suitable component ECP powders are summarized in Table 1.

TABLE 1

| | ECP COMPONENTS SiO2 COATED CORES | | | |
|---|---|---|---|---|
| | "XC" | "M" | "S" | "T" |
| Av. Part 1. Size (microns) | 0.1–5 | 0.1–20 | 0.5–15 | 0.1–20 |
| Aspect Ratio | ~1 | 10–100 | ~1 | ~1 |
| Tapped Density g/cc | 0.3–0.7 | 0.4–0.7 | 0.2–0.6 | 0.9–1.3 |
| Dry Powder Resistivity ohm-cm | ~1 | 20–300 | 2–30 | 2–30 |

In another aspect of the invention one or more component powders can be particulate material which is not associated with antimony-containing tin oxide and which is not electroconductive (hereinafter referred to as a "filler"), with the limitation that at least one type of ECP powder must be a component of the PECP mixture. Powders suitable for use as a filler can comprise or consist of at least one member of amorphous silica particles, hollow silica shells, the group of core particles described previously, among others.

The PECP compositions of the invention are intimate mixtures of the above described components. By "intimate mixture" it is meant that the ECP components are homogeneously mixed such that there are substantially no concentration gradients within the PECP. The mixtures may comprise or consist essentially of binary, ternary, quaternary or multicomponent systems depending upon the desired number of different ECP types included in a mixture. For best results, an individual type of ECP typically constitutes at least about 2 wt %, normally at least about 5 wt % and usually at least about 10 wt % of the PECP. From a practical standpoint, ternary mixtures are normally preferred over multicomponent mixtures. Most preferred are binary mixtures with neither component constituting less than about 10 wt % of the mixture. When the content of an ECP component is less than about 2 wt % its contribution to the synergistic improvement in dry powder conductivity and end-use performance tends to be reduced, if not eliminated. The proportions of ECP types which are mixed together to give a PECP depends on the particular application for which the PECP is intended. Wide ranges of adjustment can be made so that a PECP can be tailored with respect to both the types of ECP and non ECP powders comprising the composition and to their proportions in order to achieve a desired combination of properties such as resistivity, transparency and degree of color or whiteness.

PECP powders are prepared by an intensive but gentle mixing of the component powders in which the individual components are intermingled to obtain an intimate mixture while minimizing any changes to the morphology and integrity of the individual particles. It is particularly important in the case of ECP component particles having surface coatings of antimony-containing tin oxide that the continuity of the coating not be adversely affected, e.g., disrupted, by the mixing procedure. If the mixing procedure is too severe these intermingling constraints are not met and the electroconductive character of the ECP component particles is adversely affected resulting in decreased performance in end-use applications thus counteracting the desirable synergistic improvement observed for PECP prepared by a suitable mixing procedure. On the other hand if the mixing procedure is not sufficiently thorough the component powders are not intimately mixed and the resulting powder is inhomogeneous and very little improvement in performance is obtained, compared with the weighted average of the ECP components.

The "intermingling" of the component powders can be accomplished in any suitable manner provided that the procedures comply with the above requirements. In some cases, the ECP component powders are passed several times, e.g., 10 times, through a commercially available sample splitter and thereafter intermingled by using any suitable commercially available agitating or shaking equipment, e.g., a paint shaker for a period of at least about 30 minutes. While any suitable commercially available equipment such as a Patterson Kelly V-Blender can be used for intermingling the ECP component powders to obtain an intimate mixture, the following is an example of a suitable procedure which was used to prepare the PECP compositions described in the examples.

(a) Thoroughly blend the desired amounts of component powders, such as by passing the mixture at least 10 times through a commercially available sample splitter, or a sufficient number of passes to produce a mixture having visual macroscopic homogeneity;

(b) Add the blended powders to a suitable container such as a jar together with a mixing aid, such as small pieces of an elastomeric material;

(c) Agitate the mixture in the container by using, for example, a commercial paint shaker for a period of from about 10 to about 60 minutes, normally about 30 minutes; and (d) Separate the mixed powder from the mixing aid by using conventional screening or sieving methods.

Pieces of Tygon® polypropylene tubing, about 1" long and 1" in diameter, are suitable as a mixing aid when employed with an agitation means, such as that produced by a commercial paint shaker is very effective in achieving the desired "intermingling" of the powders. A comparison of different mixing methods as a function of dry powder resistance (DPR) for a binary mixture consisting of 80 wt % of ECP-M and 20 wt % of ECP-S is listed in Table 2.

TABLE 2

EFFECT OF MIXING METHOD ON DRY POWDER RESISTIVITY
OF 80 WT % "ECP-M"(a)/20 WT % "ECP-S"(b)

| MIXING METHOD | D.P.R.(c) 4000 psi ohm-cm | REMARKS |
|---|---|---|
| 5 min, rolled in jar | 118 | Incomplete mixing |
| 10 min, rolled in jar | 97 | Incomplete mixing |
| Intermingling(d) | 86 | Intimate mixing without damage to electro-conductive coating on particles (NITROGEN ABSORPTION) N2 Surface area = 33.4 m2/g |
| Ballmilled dry for 60 min | 128 | Significant damage to electroconductive coating on particles N2 S.A. = 37.6 m2/g |
| Ballmilled dry for 96 hours | 153 × 10⁶ | Severe damage to electroconductive coating and fracturing of particles N2 S.A. = 48.1 m2/g |

(a)DPR = 286 ohm-cm S.A. = 33.1 m2/g
(b)DPR = 8.9 ohm-cm S.A. = 34.6 m2/g
(c)The D.P.R. values shown in Table 2 are averages of several measurements.
(d)Powders blended 10x through a sample splitter, mixed with pieces of Tygon tubing and shaken for 30 minutes using a "Red Devil" Model 5410 paint shaker.

The effectiveness of the mixing procedure was ascertained by comparing the dry powder resistivity (DPR) of the mixtures. The dry powder resistivity is an important property of the PECP compositions of the invention. The electroconductivity of a powder is an inverse function of the resistivity and it is desirable that the dry powder resistivity be as low as possible so that the powder is most effective when incorporated in coatings, films and other substrates to make them electrically conducting.

Tumbling the powders for a period of about 5 to 10 minutes in a rotating cylindrical container is normally inadequate to obtain an intimate mixture and the synergism between the components is not fully developed as is shown by the measured DPR values of Table 2. Ballmilling the mixed powders for about 60 minutes is too severe and the electroconductive particle coatings are normally disrupted, e.g., the conducting network of antimony-containing tin oxide crystallites is interrupted. When ballmilling is continued for a longer period, such as 96 hours, the electroconductive particle coatings are destroyed and fracturing of particles occurs, as evidenced by increased surface area. The DPR of the mixture is higher by a factor of over one million showing that it is essentially non-conducting.

The dry powder resistance (DPR) was measured by using a cylindrical cell. The cell was constructed with brass electrodes at the top and bottom, that fit snugly inside a cylindrical piece of plastic having an internal diameter of about 3 centimeters. Copper leads attached to the brass electrodes were connected to an ohm meter. With the bottom electrode in position a sample of powder was introduced into the plastic cylinder and the top electrode was placed in position above the powder. The height of the powder should be about 2.0 cm before applying pressure to the powder. Using a Carver laboratory press, the powder sample was compressed at a pressure of about 4000 psi between the upper face of the bottom electrode and the lower face of the top electrode. The height and electrical resistivity of the powder were then measured, the latter with the ohm meter.

The value of the powder resistance, at the compression used, was obtained, by the following calculation:

Resistivity=(Resistance×Area)/Height;

"Resistance" is measured in ohms,

"Area" of cylinder cross-section in square centimeters, and;

"Height" is the length of the powder column between the top and bottom electrodes in centimeters. In the case of the cell used in the following examples the area is 7.07 square centimeters. The PECP can be tailored to obtain a virtually unlimited array of resistivities; normally from about 10 micro ohm cm to about 5,000 ohm cm. In most cases, the DPR of the PECP will be at least about 5% lower than the weighted Average DPR of the component ECPs.

The efficiency-in-use of a PECP for imparting electroconductive properties to a coating can be ascertained by dispersing the powder into an aqueous vehicle containing a film forming binder such as an acrylic resin, e.g. "HTV" version The aqueous powder dispersion is coated onto a glass plate using a wet film applicator that can form an approximately 0.003 inch thick wet film "drawdown" on the glass plate. After drying for about 14 hours, in air, the surface resistivity (S.R.) of the coating is measured using a commercially available milli-to-2 ohmeter (Dr. Thiedig Corp) and a Model 803A surface/volume resistivity probe (Monroe Electronics Inc., Lyndonville, N.Y.). These instruments give direct readings in ohms per square. The lower the value of S.R. the higher the electroconductivity of the film. The surface loading of powder is determined by weighing the glass plate prior to and after coating, then multiplying the weight difference by the percentage of powder in the coating film and dividing by the area coated. The surface loading is conventionally expressed in pounds per 1000 square feet of surface, (lbs/Kft2). The drawn PECP containing films of the invention typically have a DPR that ranges from about $1 \times 10^3$ to about $1 \times 10^{12}$ ohms/square.

The method that was used to determine the degree of transparency of the conductive coatings consists of preparing a conductive coating on an ⅛ in. thick glass plate, i.e., a commercially available transparent window-glass. Then placing the coated glass-plate on a standard optometrist eye-chart in direct contact with the eye-chart with the coated side of the glass plate facing towards the observer and reading the eye-chart from a distance of about 18 inches directly above the sample. The row number with the smallest print that can be read through the sample is the transparency number. The row with the largest print is row #1 and the row with the smallest print size has the highest number. The better the transparency of the sample the smaller the print size and consequently the higher the row number that can be read through the sample. A higher number corresponds to a higher degree of transparency. While the PECPs can be used in coatings having a wide range of transparencies, the transparencies number that normally range from about 2 to about 9. Such a transparency is at least about 3% greater than the transparency that can be obtained by using the less transparent powder component alone.

The method that was used for measuring whiteness/ brightness corresponds to the procedure that is conventionally used with a Hunter Labscan Model S.100 colorimeteric. It is a colorimetric measurement, known as the L*a*b* procedure, which utilizes a Hunter Labscan Model 5100 colorimeter. This generates numerical values for L*, a* and b* which define the whiteness/brightness (L*) and color (a*,b*) of the surface under examination. L* relates to the degree of brightness or darkness of the sample with 100 being very bright and zero being very dark. Although the PECPs can be tailored to possess a wide range of whiteness, usually the whiteness value L ranges from about 20 to about 95. Such a whiteness is at least about 2% greater than the whiteness that can be obtained by the less white powder component alone.

The efficiency-in-use of PECP can be influenced in at least two aspects. The first aspect relates to the efficiency of the intra-networking of the antimony-containing tin oxide crystallites on the surface of individual ECP particles. The second aspect relates to the efficiency relating of the inter-networking between ECP particles. The latter aspect is caused by particle-to-particle contact which is a function of particle morphology and orientation. The intermingling of several types of ECP powders, which may have different levels of [SnO2(Sb)], in the component particles results in better than predicted properties, such as electrical conductivity, transparency and degree of whiteness, compared with the weighted average of the individual types of ECP powder. For example in the case of ECP particles having mica platelet cores, i.e., ECP-M, the particle aggregates may be in the form of "stacks of platelets" which is less efficient for coverage of a surface by an inter-network between particles. When such particles are intermingled with the relatively equiaxed silica shell core ECP particles, i.e., ECP-S, a surprising and unexpected effect can occur. Without wishing to be bound by any theory or explanation it is believed that there is a destacking of the platelet-shaped ECP particles with the more equi-dimensional silica shell core particles positioning themselves between the platelets resulting in a configuration that covers an area of surface more efficiently. In the case a mixture of generally equiaxed ECP particles, e.g., a PECP of silica shell cores (ECP-S) and titanium dioxide cores (ECP-T), it is believed that there is a declustering effect when the two types are intermingled. The declustered configuration is substantially more efficient in covering a given area of surface.

Figure 1:
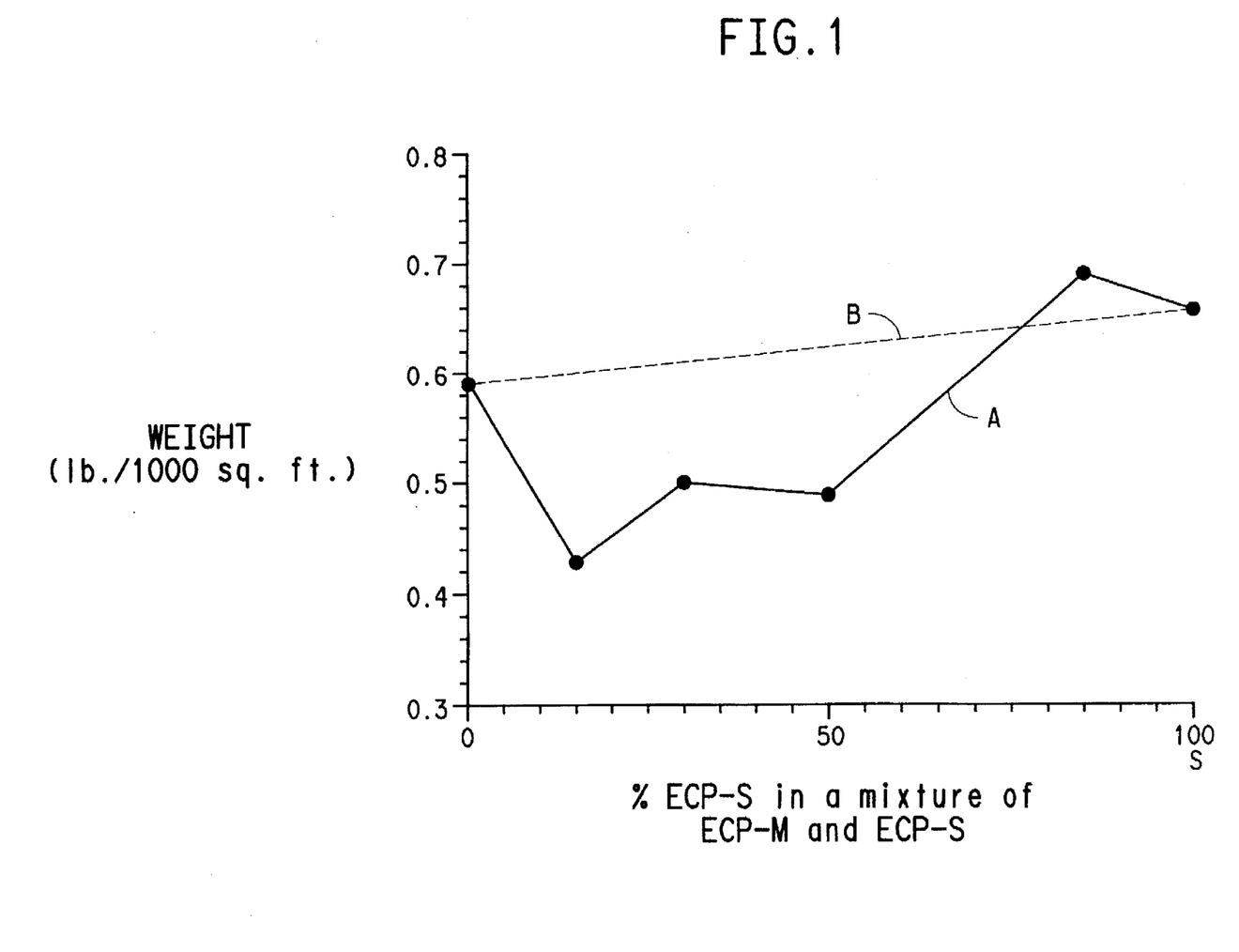
FIG. 1—FIG. 1 shows weight effectiveness for a range of PECP compositions comprising ECP-M and ECP-S.

A range of PECP compositions comprising or consisting essentially of mixtures of ECP-M and ECP-S between 100 wt % ECP-M and 100 wt % ECP-S was prepared by the "intermingling" procedure and evaluated in "HTV" varnish films in terms of surface resistivity. FIG. 1 is a plot of the weight of PECP per unit area (lbs/1000 ft2) required to obtain a surface resistivity of $10^6$ ohms per square in HTV draw-downs on glass. Plot "A" on FIG. 1 represents the measured surface resistivity of a PECP-containing film that was prepared from differing mixtures of ECP-M and ECP-S. There was a surprising and an unexpected advantage in weight effectiveness, and consequently cost effectiveness, for the optimum PECP compositions in this system compared to Plot "B" of FIG. 1 which is the weighted average of the individual ECP components. The advantage of PECP over ECP alone is illustrated by the difference between Plot A and B, which is of the order of 20% to 30% over the composition range 10 wt % ECP-M/90 wt % ECP-S to 55 wt % ECP-M/45 wt % ECP-S. As a result, the relative effectiveness of the antimony-tin oxide component of the PECP in providing a given level of electrical surface conductivity is substantially higher for a range of PECP compositions than for the individual ECP components.

The degree of transparency of coatings containing PECP is considerably higher than those containing individual ECP components. Two typical results which illustrate this for coatings containing PECP consisting of ECP-M and ECP-S versus coatings containing ECP-S only are shown in Table 3.

TABLE 3

RELATIVE TRANSPARENCY-POLYTYPE ECP VS INDIVIDUAL ECP

| COMPOSITION ECP | COATING WT % ECP | RELATIVE TRANSPARENCY EYE-CHART(c) | SURFACE RESISTIVITY OHMS/SQUARE |
|---|---|---|---|
| POLYTYPE(a) | 4 | 8,8 | $2.5 \times 10^5$ |
| INDIVIDUAL(b) | 4 | 6,6 | $4.5 \times 10^5$ |

(a)80 WT % ECP-M/20 WT % ECP-S
(b)100 WT % ECP-S
(c)SCALE OF 1 to 9 (BEST)

Another advantage of certain individual PECP compositions compared with the individual ECP components is that, for any particular level of electroconductivity, coatings containing the former can have substantially higher whiteness/brightness values (L*). This is very desirable in many applications particularly in ESD treatments for clothing and decorative materials. In the case of a PECP, in which the components are ECP-M and ECP-XC, varnish coatings are applied to glass plates and L* values are measured.

The results are shown in Table 4 together with those obtained for ECP-XC evaluated in the same way.

TABLE 4

RELATIVE WHITENESS/BRIGHTNESS PECP VS INDIVIDUAL ECP

| COMPOSITION | COATING WT% ECP | WHITENESS/ BRIGHTNESS L* (c) | SURFACE RESISTIVITY OHMS/SQUARE |
|---|---|---|---|
| POLYTYPE(a) | 4 | 71;69 | $7.0 \times 10^5$ |
|  | 1 | 79;79 | $1.2 \times 10^6$ |
| INDIVIDUAL(b) | 4 | 58;56 | $6.5 \times 10^8$ |
|  | 1 | 75;72 | $2.2 \times 10^9$ |

(a)90 WT % ECP-M/10 WT % ECP-XC
(b) 100 WT % ECP-XC
(c) L* = 100 FOR A PURE WHITE SURFACE

The compositions of the invention have surprising benefits over conventionally used single component materials which are used to produce electroconductive properties in non-conducting materials. For example, carbon black is widely used for this purpose but opacity and dark color are often undesirable. White, transparent or lightly colored products with surface resistivities in the $10^3$ to $10^{12}$ ohms/ square range are easily achievable by using the PECP compositions of the invention. Also conductivity can be easily controlled and tailored for a desired range by using the PECPs of the invention.

The compositions of the invention are particularly useful in a variety of applications such as an ingredient in electrically conductive coatings, e.g., paints, varnishes, plastic coatings such as fluoropolymer coatings, among other coatings. The PECPs can also be incorporated into or applied onto conventional paper formulations for imparting dielectric properties, and fibers, films, foams, solid containers and packing materials for providing electrostatic discharge (ESD) resistance or protection.

While particular emphasis has been placed upon binary PECP mixtures, the PECPs of the invention can be multi-component mixtures. By selecting the appropriate PECP components, the PECP can be tailored to possess a virtually unlimited array of characteristics, e.g., color, resistivity, transparency, cost effectiveness, among other characteristics.

The PECP compositions of the invention, methods of preparation and evaluation are demonstrated in the following examples for the purpose of providing more detailed information and illustrating the advantages of the present invention over the current state of the art. The following Examples are provided for illustration purposes only and are not to be construed as limiting in any way the scope of the invention as defined by the appended claims.

EXAMPLE 1

This example describes preparing an PECP comprising different proportions of mica core ECP (ECP-M) and hollow silica shell core ECP 9 (ECP-S) powders, measurement of the dry powder resistivity (DPR) of the mixtures and evaluation of electroconductive varnish films containing the mixtures.

Approximately 170 grams of mica core ECP powder, (sold by the DuPont Company under the trademark ZELEC ECP-M) was weighed out and combined with about 30 grams of hollow silica shell core ECP (DuPont, ZELEC ECP-S ). ECP-M comprised about 4 wt. % antimony and had an average particle size distribution of about 8 microns, and ECP-S comprised about 6.5 wt. % antimony and had an average particle size distribution of about 9 microns. The powder mixture was passed through a commercially available sample splitter, and mixed in a glass Jar for about 30 minutes using a paint shaker apparatus. To insure uniform mixing of the two powder types several one-inch long pieces of plastic "Tygon" tubing were added to the powder in the glass jar. After the mixing was completed the powder was separated from the pieces of "Tygon" tubing by screening through a 20 mesh Standard Sieve. The dry powder resistivity was measured by the procedure previously described.

A portion of the mixed powder was used as a solid filler in an aqueous base paint dispersion of "HTV" varnish ("High Temperature Varnish" SS-10541 from Werneke-Long, Inc., Tinley Park, Ill.), in the following concentrations 1%, 2%, 3%, 4%, 5%, and 6% of PECP 85 wt % M/15 wt % S in the aqueous HTV dispersion. So-Called "drawdowns" were made on glass plates using a wet film applicator giving an approximately 0.003 inch wet film thickness of the aqueous PECP/HTV resin suspension on the glass plates. After drying for about 14 hr. (overnight) the surface resistivity of the conductive coatings was measured as previously described.

Using substantially the same procedure several other "M"/"S" PECP compositions, containing different proportions of "M" and "S" grade ECP, were prepared. The DPR and the surface resistivity of electroconductive varnish coatings in which the compositions were incorporated were measured.

The DPR results are shown in Table 5 for the M/S binary series of PECP's, including data for the individual ECP components. The theoretical DPR, the weighted average of the component DPR, is calculated and is shown in Table 5. Using this and the actual DPRs the percent synergistic improvement (SI%) is calculated using the formula:

$$SI\% = \frac{\text{Theoretical } DPR - \text{Actual } DPR \times 100}{\text{Theoretical } DPR}$$

TABLE 5

M/S PECP MIXTURES
DRY POWDER RESISTIVITIES (DPR)

M = ECP-MICA CORE
S = ECP-SILICA SHELL CORE
COMPOSITION    DPR (OHM-CM)

| WT % M/WT % S | THEORETICAL | ACTUAL | SI % |
|---|---|---|---|
| 100M | 286 | 286 average | — |
| 85M/15S | 244 | 114 average | 53 |
| 80M/20S | 231 | 86 average | 63 |
| 70M/30S | 203 | 63 average | 69 |
| 50M/50S | 148 | 35 average | 76 |
| 15M/85S | 51 | 15 average | 71 |
| 100S | 9 | 9 average | — |

The measured DPR were substantially lower than would be expected from the weighted average of the component DPR.

The surface resistivity results obtained on the electroconductive varnish coatings are shown in Table 6. The results are expressed as ECP weight loading per 1000 sq ft to give $10^6$ ohms surface resistivity. In a number of cases the average of several duplicate experiments for the same composition is given.

TABLE 6

WEIGHT EFFECTIVENESS OF M/S PECP
FOR $10^6$ OHMS PER SQUARE SURFACE RESISTIVITY

| COMPOSITION WT % M/WT % S | WEIGHT LOADING LBS/1000 SQ. FT. |
|---|---|
| 100M | 0.59 average |
| 85M/15S | 0.43 average |
| 70M/30S | 0.50 average |
| 50M/50S | 0.49 average |
| 15M/85S | 0.69 average |
| 100S | 0.66 average |

The data from Table 6 are plotted in FIG. 1. The graph shows that the weight effectiveness of certain PECP's in this system is substantially superior to that of the pure components.

Figure 2:
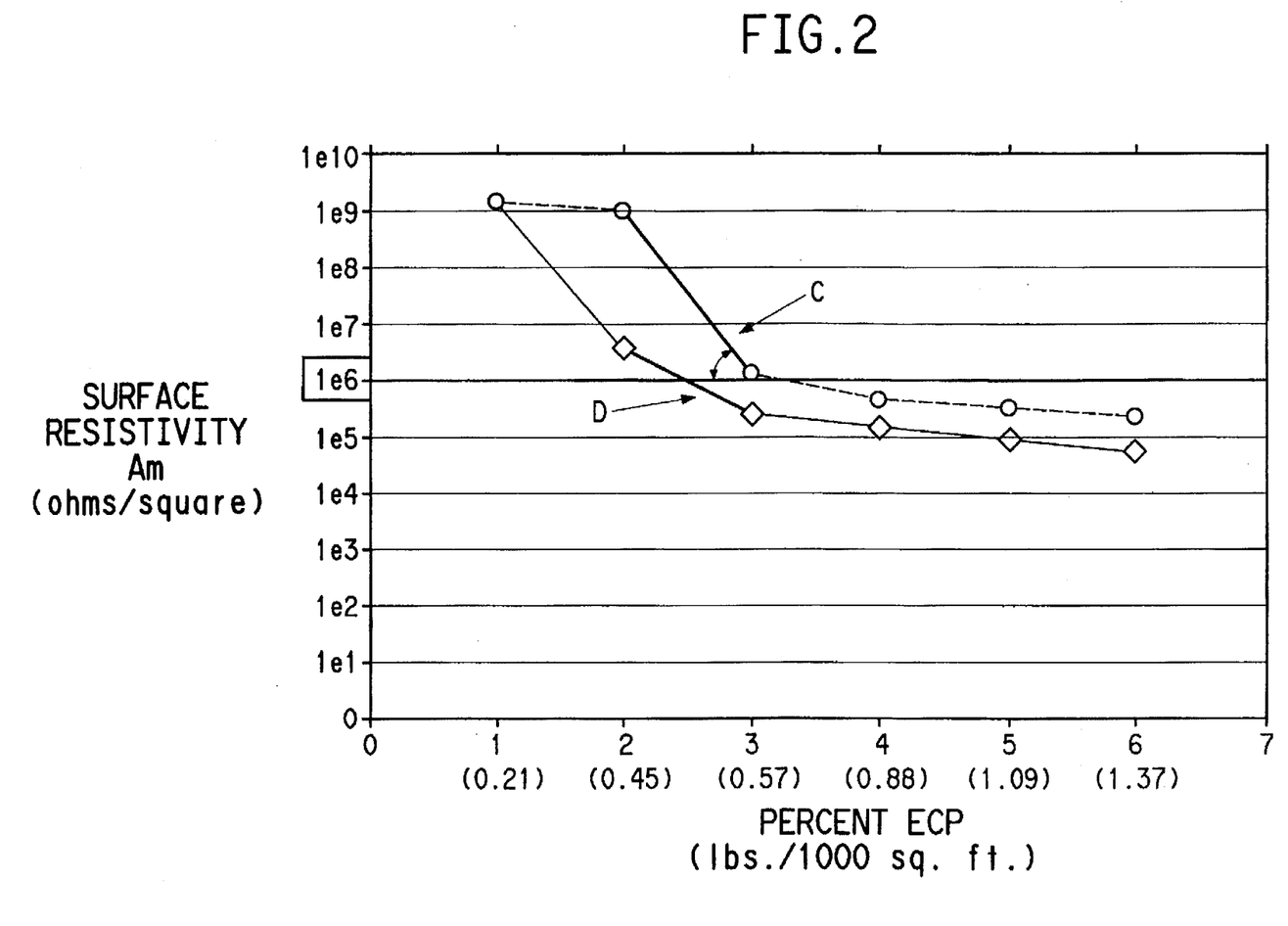
FIG. 2—FIG. 2 shows the relationship between surface resistivity and film loading for PECP compositions comprising ECP-M and ECP-S and for the ECP-M component alone.

When surface resistivity is plotted against PECP weight loading in the ECP-M/ECP-S system and compared with a similar plot for an individual component of the PECP, the PECP weight loading curve has a relatively more gradual slope in the low loading region. Referring now to FIG. 2, Plot "C" is represents the surface resistivity of ECP-M whereas Plot "D" represents the surface resistivity for a PECP consisting of 70 weight % ECP-M and 30% ECP-S. The gradual slope shown by Plot "D" illustrates the practical utility of the PECP because such a slope means that surface resistivity is less sensitive to small changes in the ECP content of the film when PECP is used. This provides a substantial benefit in end-use processing because it facilitates obtaining a desired resistivity level.

Another unexpected and beneficial characteristic of PECP in the system M/S is the fact that the relative conductive effectiveness (RCE) of the contained antimony-tin oxide in providing a given level of electrical surface conductivity is substantially higher for certain PECP mixtures than for the individual ECP components alone. This is shown in Table 7, below.

TABLE 7

CONDUCTIVITY EFFECTIVENESS OF [SnO2(Sb)] IN M/S PECP FOR $10^6$ OHMS/SQUARE SURFACE RESISTIVITY

| COMPOSITION WT % M/WT % S | WT. LOADG. | CONTENT OF TOTAL RCE1 (% NOMINAL) | |
|---|---|---|---|
| [SnO2(Sb)] | LB/1000 FT2 | (A) | (B) |
| 100 M | 0.59 | 39.1 | 0.043 |
| 85 M/15 S | 0.43 | 42.5 | 0.055 |
| 70 M/30 S | 0.50 | 45.7 | 0.044 |
| 50 M/50 S | 0.49 | 50.3 | 0.040 |
| 15 M/85 S | 0.69 | 58.2 | 0.025 |
| 100 S | 0.66 | 61.2 | 0.025 |

1RCE = Relative Conductivity Effectiveness = $\frac{1}{(A) \times (B)}$

EXAMPLE 2

This example describes the preparation of PECP comprising different proportions of mica core ECP (ECP-M) and titanium dioxide core ECP (ECP-T), measurement of the DPC of the mixtures and evaluation of electroconductive varnish films.

Using substantially the same procedure described in Example several M/T PECP compositions, comprising different proportions of ECP-M and ECP-T (sold by the DuPont Company as ZELEC ECP-M and ZELEC@ ECP-T) powders were used for preparing a PECP. ECP-T comprised about 4 wt. % antimony containing tin oxide upon a TiO$_2$ core particle, and had an average particle size distribution of about 5 microns. The DPR and the surface resistivity of electroconductive varnish coatings in which the compositions were incorporated, as described in Example 1, were measured.

The DPR results are shown in Table 8 for the M/T binary series of PECP including data for the individual ECP components.

TABLE 8

M/T PECP DRY POWDER RESISTIVITIES (DPR)

| PECP MIX RATIO | DPR (OHM-CM) | | |
|---|---|---|---|
| WT % M/WT % T | THEORETICAL | ACTUAL | S.I. % |
| 100M | 286 | 286 average | — |
| 67M/33T | 193 | 36 | 81 |
| 50M/50T | 145 | 28 | 81 |
| 33M/67T | 96 | 11 average | 89 |
| 100T | 3 | 3 average | — |

The measured DPR are substantially lower than would be expected from the weighted average of the component DPR.

The surface resistivity results obtained on the electroconductive varnish coatings are shown in Table 9 wherein the results are expressed in ECP loading in pounds per 1000 sq. ft. to obtain $10^6$ ohms surface resistivity. In a number of cases the average of several duplicate experiments for the same composition is given.

TABLE 9

WEIGHT EFFECTIVENESS OF M/T PECP FOR $10^6$ OHMS PER SQUARE SURFACE RESISTIVITY

| PECP MIX RATIO WT % M/Wt % TLBS/1000 SQ FT | WT LOADING |
|---|---|
| 100M | 0.69 average |
| 67M/33T | 0.68 |
| 50M/50T | 0.62 |
| 33M/67T | 0.60 average |
| 100T | 0.83 average |

Figure 3:
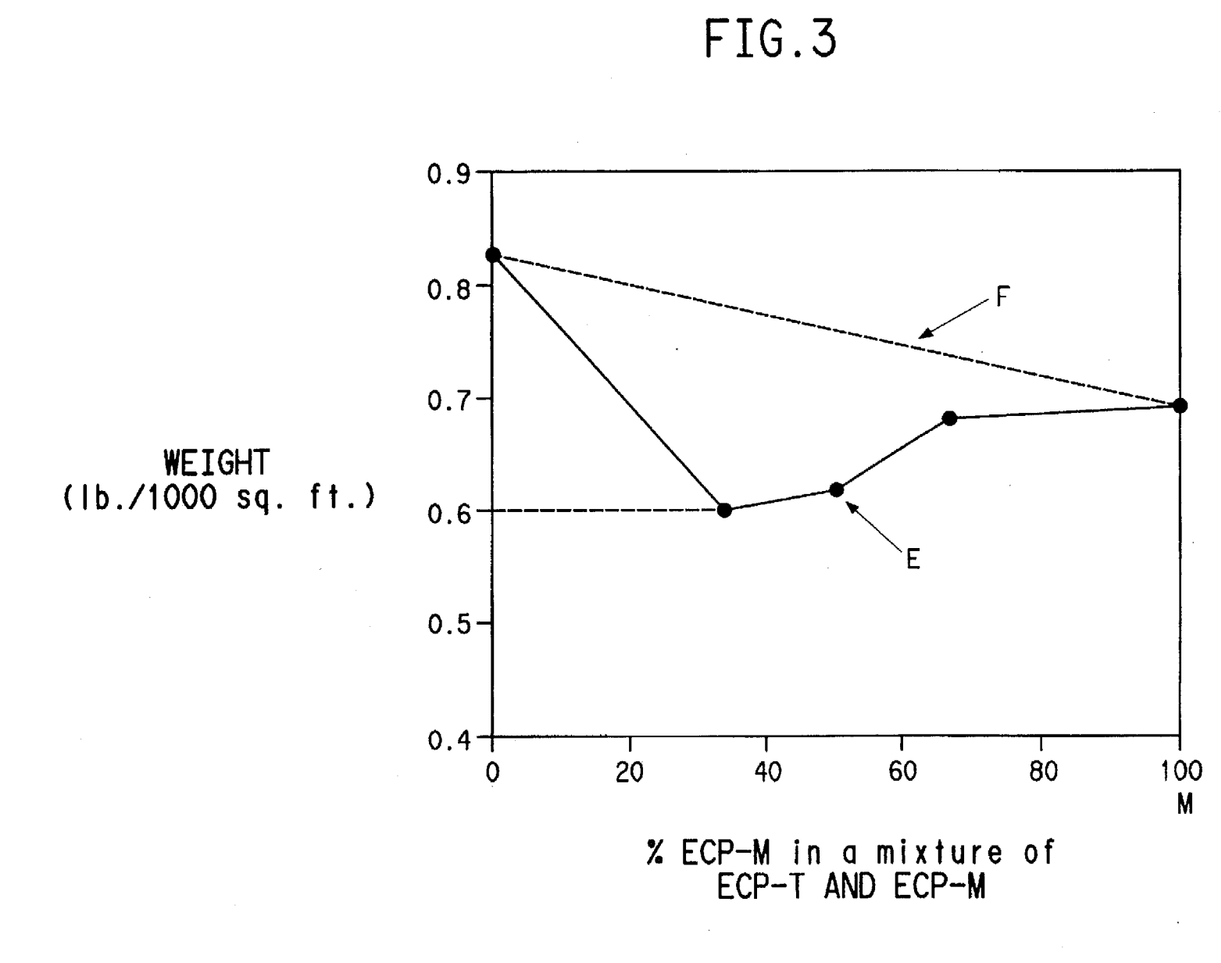
FIG. 3—FIG. 3 shows the weight effectiveness of a range of PECP compositions comprising ECP-M and ECP-T.

The data from table 9 are plotted in FIG. 3. Plot "E" on FIG. 3 shows that the weight effectiveness of certain PECP in this system was superior to that of the pure components that are represented by Plot "F".

Figure 4:
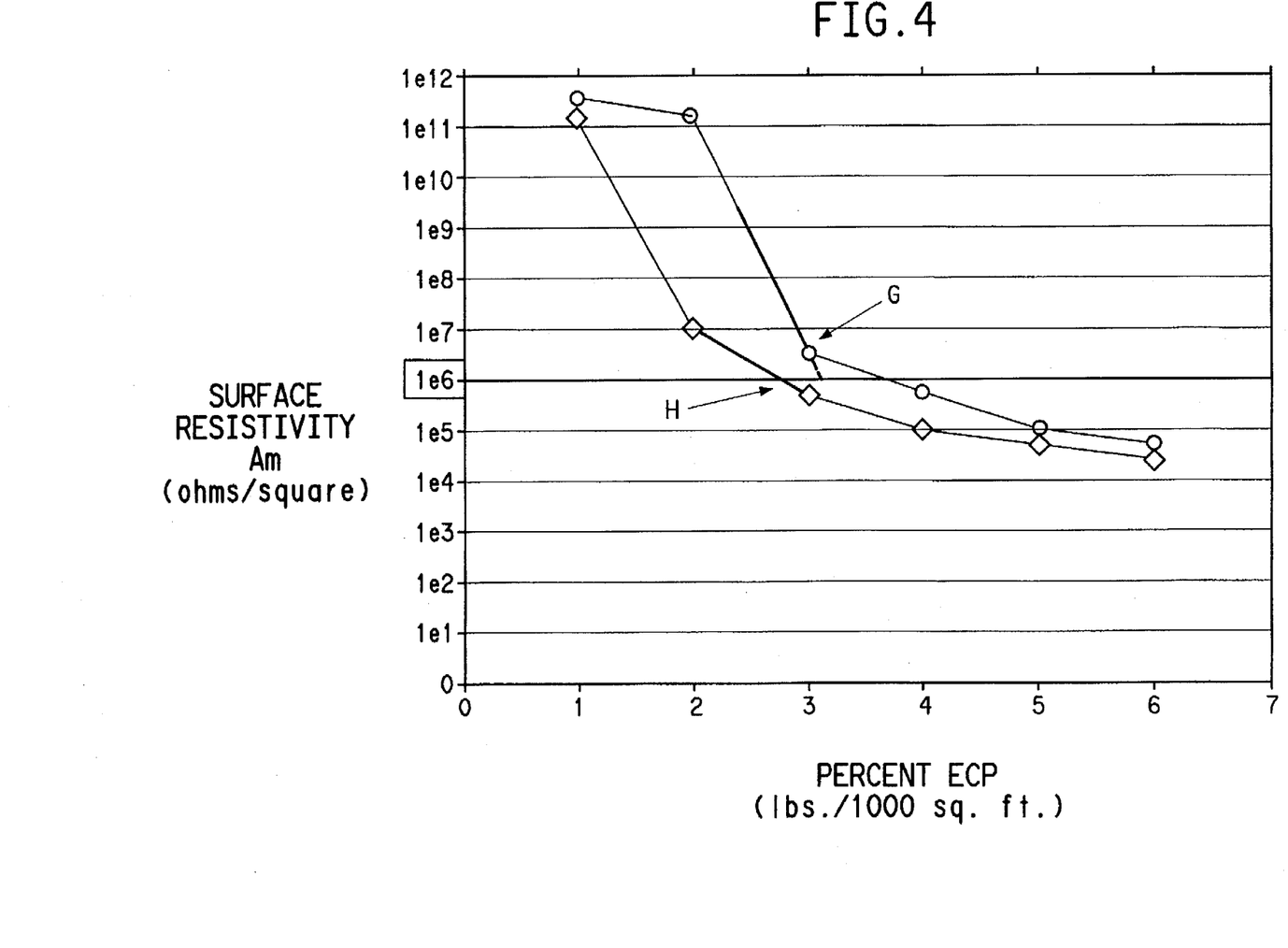
FIG. 4—FIG. 4 shows the relationship between surface resistivity and film loading of PECP compositions comprising ECP-M and ECP-T and of the ECP-T component alone.

The relatively gentle slope of the surface resistivity vs ECP loading curve for the PECP 67%T/33%M in the important region of low ECP loadings is shown in FIG. 4. Referring now to FIG. 4, Plot "G" represents the 100% ECP-T material that has a relatively steep slope in the region of low ECP loadings in comparison to Plot "H" that represents a PECP consisting of 67% ECP-T/33% ECP-M.

Another unexpected and beneficial characteristic of PECP in the system M/T is the fact that the relative conductive effectiveness (RCE) of the contained antimony-tin oxide in providing a given level of electrical surface conductivity is relatively higher for certain PECP compositions than for the individual ECP components. This is shown in Table 10 below.

TABLE 10

CONDUCTIVITY EFFECTIVENESS OF [SnO2(Sb)] in M/T PECP FOR $10^6$ OHMS/SQUARE SURFACE RESISTIVITY

| COMPOSITION % T/% M | CONTENT OF TOTAL WT. LOADING LBS/1000 SQ FT | | [SnO2(Sb)] (% NOMINAL) |
|---|---|---|---|
| | (A) | (B) | RCE1 |
| 100 M | 0.69 av. | 40 | 0.036 |
| 67 M/33 T | 0.68 | 40 | 0.037 |
| 50 M/50 T | 0.62 | 40 | 0.040 |
| 33 M/67 T | 0.60 av. | 40 | 0.042 |
| 100 T | 0.83 av. | 40 | 0.030 |

1RCE = Relative Conductivity Effectiveness = $\frac{1}{(A) \times (B)}$

EXAMPLE 3

This example describes the preparation of PECP comprising different proportions of mica core ECP (ECP-M) and antimony-containing tin oxide ECP without a core (ECP-XC) and measurement of the DPR of the mixtures.

Using substantially the same procedure described in Example several PECP compositions, comprising different proportions of ECP-M, ECP-XC (sold by the DuPont Company as ZELEC ECP-M and DuPont, ZELEC-ECP-3005-XC) powders were prepared. ECP-XC comprised about 10 wt % antimony, lacked any core material, and had an average particle size distribution of about 2 microns. The DPR of the PECP compositions were measured and the results are shown in Table 11, including data for the individual ECP components.

TABLE 11

| PECP MIX RATIO | DPR (OHM-CM) | | |
|---|---|---|---|
| WT % M/WT % XC | THEORETICAL | ACTUAL | S.I. % |
| 100M | 286 | 286 | — |
| 95M/5XC | 272 | 109 | 60 |
| 90M/10XC | 257 | 83 | 68 |
| 50M/50XC | 144 | 15 | 90 |
| 10M/90XC | 30 | 2 | 93 |
| 100XC | 1 | 1 | — |

The measured DPR are substantially lower than would be expected from the weighted average of the component DPR.

EXAMPLE 4

This example describes the preparation of PECP comprising different proportions of mica core ECP (ECP-M), silica shell core ECP (ECP-S) and antimony-containing tin oxide and measurement of the DPR of the mixtures.

Using substantially the same procedure described in Example two PECP compositions comprising different proportions of ECP-M, ECP-S and ECP-XC (sold by the DuPont Company as ZELEC M, S and XC grade ECP powders) were prepared. The DPR of the PECP compositions was measured and the results are shown in Table 12.

TABLE 12

| PECP MIX RATIO | DPR (OHM-CM) | | |
|---|---|---|---|
| WT % M/S/XC | THEORETICAL | ACTUAL | S.I. % |
| 75M/15S/10XC | 216 | 54 | 75 |
| 15M/75S/10XC | 50 | 8 | 84 |

The measured DPR are substantially lower than would be expected from the weighted average of the component DPR.

EXAMPLE 5

This example describes the preparation of PECP comprising mica core ECP (ECP-M), silica shell core ECP (ECP-S), titanium dioxide core ECP (ECP-T) and antimony-containing tin oxide and measurement of the DPR of the mixtures.

Using substantially the same procedure described in Example a PECP composition comprising different proportions of ECP-M, ECP-S, and ECP-T (sold by the DuPont Company as ZELEC M, S, T and XC grade ECP powders) was prepared. The DPR of the PECP composition was measured and the result shown in Table 13

TABLE 13

| PECP MIX RATIO | DPR (OHM-CM) | | |
|---|---|---|---|
| WT % M/S/T/XC | THEORETICAL | ACTUAL | S.I. % |
| 132 30M/10S/50T/10XC | 89 | 10 | 89 |

The measured DPR is substantially lower than would be expected from the weighted average of the component DPR.

EXAMPLE 6

This example describes the preparation of mixtures comprising mica core ECP (ECP-M) and certain fillers, namely, $TiO_2$ powders and non-conductive $SiO_2$ shell powders. The DPR of the mixtures was measured and the surface resistivity versus ECP loading curve for varnish films containing the mixtures was determined.

Using the procedure described in Example 1 the mixtures listed in Table 14 were prepared. The DPR of the mixtures was measured 10 and the results are shown in Table 14.

TABLE 14

| PECP MIX RATIO | DPR (OHM-CM) | | |
|---|---|---|---|
| WT % M/WT % $TiO_2$ | THEORETICAL | ACTUAL | S.I. % |
| 100M | 286 | 286 | — |
| 90M/10$TiO_2$ | 1257 | 148 | 88 |
| 70M/30$TiO_2$ | 3200 | 191 | 94 |
| 95M/5$SiO_2$ | 772 | 219 | 72 |
| 80M/20$SiO_2$ | 2229 | 481 | 78 |
| 100 $TiO_2$ | >10,000 | >10,000 | — |
| 100 $SiO_2$ "shells" | >10,000 | >10,000 | — |

All the mixtures have a much lower DPR than expected which is another manifestation of unexpected synergism between the component powders.

Using the procedure described in Example 1 two of the mixed powders were evaluated in an aqueous base paint dispersion of HTV varnish. Using concentrations of 1%, 2%, 3%, 4%, 5% and 6% of a) 70 wt % M/30 wt % $TiO_2$ and b) 80 wt % M/20 wt % $SiO_2$ "shells" in the aqueous HTV dispersion, glass plates were coated with films and the surface resistivity of the coatings was measured as previously described. The measured surface resistivities are plotted against the percent ECP in the dispersion and the results are shown in FIG. 5.

Figure 5:
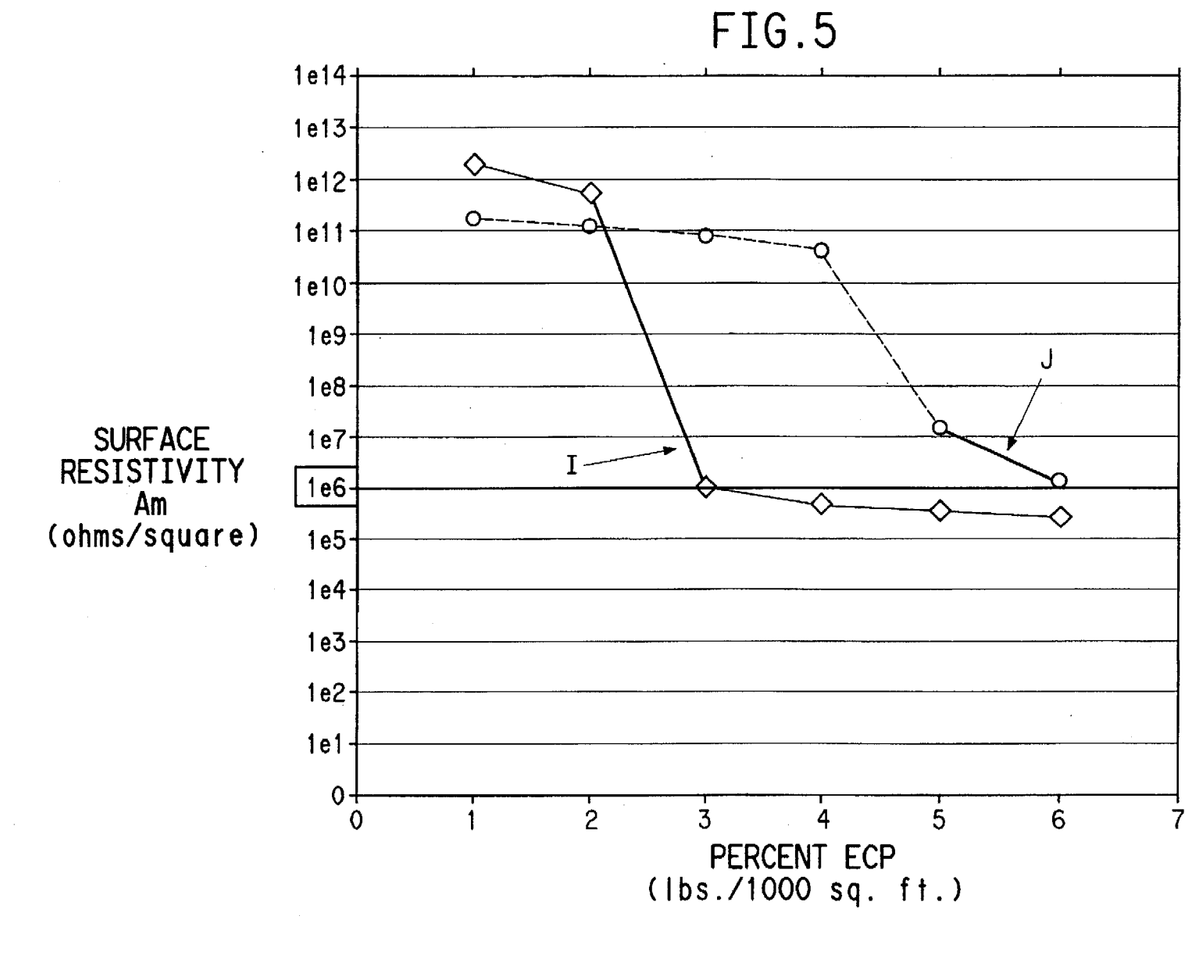
FIG. 5—FIG. 5 shows the relationship between surface resistivity and film loading for PECP compositions comprising ECP-M and TiO2 and for the ECP-M component alone.
Figure 6:
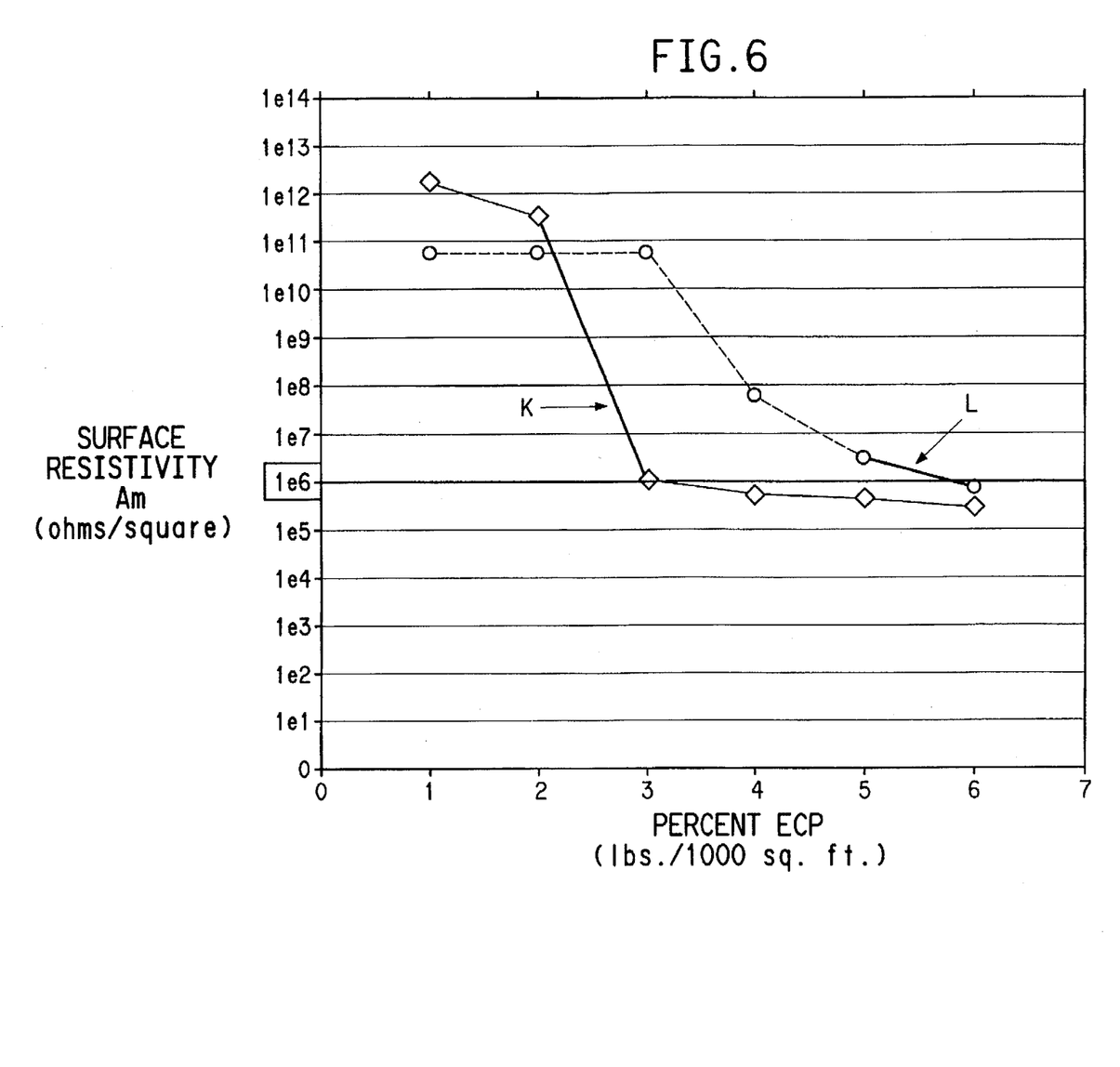
FIG. 6—FIG. 6 shows the relationship between surface resistivity and film loading for PECP compositions comprising ECP-M and SiO2.

Referring now to FIG. 5, Plot "I" represents 100% ECP-M, whereas Plot "J" represents a PECP consisting of 70% ECP-M and 30% uncoated $TiO_2$. Referring now to FIG. 6, Plot "K" represents 100% ECP-M and Plot "L" represents a PECP consisting of 80% ECP-M and 20% uncoated silica shells. In each of FIGS. 5 and 6 data obtained illustrates that the mixtures containing either $TiO_2$ or $SiO_2$ "shells" are found to have a gentle slope whereas that corresponding to 100% ECP-M is relatively steep in the region of low ECP loadings.

EXAMPLE 7

This Example describes preparing a PECP comprising ECP-M and a calcium carbonate filler material.

Using substantially the same procedure described in Example 1 a PECP was prepared from ECP-M and $CaCO_3$ (commercially available Calcium Carbonate sold as "HO-DRY"). The DPR was measured as described in Example 1. The DPR results are shown in Table 15 for the ECP-M/calcium carbonate series of PECP including data for the individual PECP components.

TABLE 15

ECP-M/CALCIUM CARBONATE
DRY POWDER RESISTIVITIES (DPR)

| PECP MIX RATIO | DPR (OHM-CM) | | |
|---|---|---|---|
| WT % M/WT % CaCO$_3$ | THEORETICAL | ACTUAL | S.I. % |
| 100M | 286 | 286 | — |
| 98m/2CaCo$_3$ | 480 | 189 | 61 |
| 95M/5CaCO$_3$ | 743 | 209 | 72 |
| 90M/10CaCO$_3$ | 1257 | 215 | 83 |
| 100 CaCO$_3$ | >10,000 | >10,000 | — |

EXAMPLE 8

This example describes the preparation of PECPs comprising different proportions of ECP-S, ECP-T, and ECP-XC, and measurement of DPR.

Using substantially the same procedures described in Example 1 several PECP compositions comprising ECP-S/ECP-T and ECP-XC were prepared. The DPR was measured substantially as described in Example 1.

TABLE 16

Dry Powder Resistivities (DPR)

| PECP MIX RATIO | DPR (OHM-CM) | | |
|---|---|---|---|
| WT. % | THEORETICAL | ACTUAL | S.I. % |
| 100 S | 9 | 9 | — |
| 33S/67 T | 4.98 | 4.60 | 8 |
| 100 T | 3 | 3 | — |
| 67S/33 XC | 6.36 | 4.32 | 32 |
| 100 XC | 1 | 1 | — |
| 67T/33 XC | 2.34 | 1.57 | 33 |

EXAMPLE 9

This Example describes preparing a PECP using an ECP comprising silver coated silica shells (hereinafter referred to as "Ag shells"). The Ag shells were produced substantially in accordance with Example 3 of U.S. patent application Ser. No. 07/979,497, filed on Nov. 20, 1992; hereby expressly incorporated by reference. The "Ag SHELLS" were made without tin (Sn) and without antimony (Sb).

Using substantially the same procedure described in Example 1, a PECP was prepared from Ag shells, ECP-M, and uncoated mica. The uncoated mica corresponded to the particles that were used as core particles to prepare ECP-M. The DPR was measured as described in Example 1. The DPR results are shown in Table 17 for Ag Shells/UNCOATED MICA and in Table 18 Br Ag SHELLS/ECP-M including data for the individual components.

TABLE 17

Polytype ECP's Using Silver-Coated Shells
DRY POWDER RESISTIVITIES (DPR)

| PECP MIX RATIO | DPR (OHM-CM) | | |
|---|---|---|---|
| WT. % | THEORETICAL | ACTUAL | S.I. % |
| 100% Ag Shells | 0.6 | 0.6 | — |
| 80 Ag Shells/20 Mica | 2000 | 0.89 | 99 |
| 100 Uncoated Mica | >10,000 | >10,000 | — |

TABLE 18

| PECP MIX RATIO | DPR (OHM-CM) | | |
|---|---|---|---|
| WT. % | THEORETICAL | ACTUAL | S.I. % |
| 100% Ag Shells | 0.6 | 0.6 | — |
| 30 Ag Shells/70 ECP-M | 200 | 77 | 62 |
| 100 ECP-M | 286 | 286 | — |

While certain aspects have been described and illustrated above, a person having ordinary skill in this art will recognize that all variations and embodiments are encompassed by the appended claims.

The following is claimed:

1. An electroconductive composition comprising 1) a mixture of A) particles of an electroconductive powder comprising antimony-containing tin oxide and B) separate particles of a non-electrically conducting filler selected from the group consisting of silica, titanium dioxide, mica, calcium carbonate, and mixtures thereof, in a ratio of electroconductive powder to non-electrically conducting filler of from about 98:2 to about 7:3, said mixture possessing a dry powder resistivity which is lower than the weighted average of its components, and said mixture dispersed in or applied onto 2) a matrix material selected from the group consisting of paints, varnishes, plastics, and paper.

2. The composition of claim 1 wherein the dry powder resistivity of said mixture is at least 5% lower than the weighted average dry powder resistivity of the components.

3. The electroconductive composition of claim 1 wherein the slope of a surface resistivity versus mixture weight loading curve is at least 5% less steep than that of the individual electroconductive powder component having the steepest slope measured over the same weight loading.

4. The electroconductive composition of claim 1 wherein the electroconductive powder is selected from the group consisting of crystallites of antimony-containing tin oxide, metal coated powders and two dimensional networks of crystallites of antimony-containing tin oxide in association with amorphous silica or silica-containing material.

5. The electroconductive composition of claim 1 wherein said electroconductive powder comprises a conducting coating of antimony-containing tin oxide on a core particle.

6. The electroconductive composition of claim 5 wherein the antimony content is less than about 12.5% by weight of tin oxide.

7. The composition of claim 1 wherein the transparency of said mixture is at least about 3% greater than the transparency of said individual components of the mixture.

8. The electroconductive composition of claim 5 wherein the core particle is selected from the group consisting of mica; silica; calcium carbonate; oxides of titanium, magnesium, calcium, barium, strontium, zinc, tin, nickel and iron; barium carbonate; strontium carbonate; calcium sulfate; barium sulfate; strontium sulfate, cordierite; anorthite; and pyrophyllite.

9. The electroconductive composition of claim 1 wherein the non-electrically conductive filler is selected from the group consisting of calcium carbonate; silica; mica; oxides of titanium, magnesium, calcium, barium, strontium, zinc, tin, nickel and iron; barium carbonate; strontium carbonate; calcium sulfate; barium sulfate; strontium sulfate, cordierite; anorthite; and pyrophyllite.

10. The composition of claim 1 wherein said mixture comprises a first component selected from the group consisting of mica platelets having an antimony-containing tin oxide layer and silica shells having an antimony-containing tin oxide layer, a second component selected from the group consisting of titanium dioxide having an antimony-containing tin oxide layer and amorphous silica having an antimony-containing tin oxide layer, and a third component of a non-electrically conductive filler.

* * * * *